United States Patent [19]

Cunningham

[11] E Re. 29,873

[45] Reissued Jan. 2, 1979

[54] SCRAPLESS PLASTIC SHEET MULTI-PACKAGING DEVICE

[75] Inventor: Ernest R. Cunningham, Libertyville, Ill.

[73] Assignee: Grip-Pak Systems, Inc., Cape Girardeau, Mo.

[21] Appl. No.: 790,450

[22] Filed: Apr. 25, 1977

Related U.S. Patent Documents

Reissue of:

[64] Patent No.: 3,966,044
Issued: Jun. 29, 1976
Appl. No.: 563,885
Filed: Mar. 31, 1975

[51] Int. Cl.[2] ..... B65D 71/02

[52] U.S. Cl. ..... 206/150; 206/427; 294/87.2

[58] Field of Search ..... 156/197; 206/150, 427; 294/87.2; 428/116, 136

[56] References Cited

U.S. PATENT DOCUMENTS

| | | | |
|---|---|---|---|
| 3,044,230 | 7/1962 | Fisher | 206/150 X |
| 3,082,142 | 3/1963 | Payne et al. | 156/197 |
| 3,385,626 | 5/1968 | Wozniak | 206/150 X |
| 3,627,123 | 12/1971 | Wachter | 206/150 |
| 3,756,496 | 9/1973 | Oostdik | 229/15 |
| 3,778,096 | 12/1973 | Smith | 294/87.2 |
| 3,785,484 | 1/1974 | Cunningham | 206/427 |

*Primary Examiner*—Steven E. Lipman
*Attorney, Agent, or Firm*—Michael Kovac

[57] ABSTRACT

A scrapless multi-packaging device for a plurality of containers is formed from a stretchable and elastic sheet of plastic material including laterally connected pairs of sheet material bands arranged in longitudinal rows and with longitudinal connections between adjacent sheet material bands in each row, the connections between said sheet material bands being creased to provide automatic opening of the sheet material bands in upstanding relationship for assembly to containers. The connections may also be perforated to facilitate separation into groups of bands as well as into individual bands.

7 Claims, 8 Drawing Figures

Fig. 1
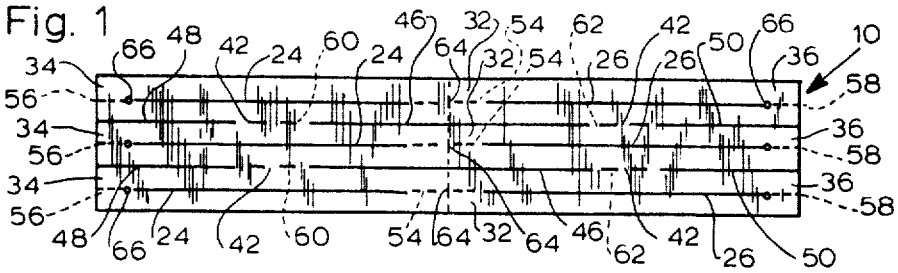
Fig. 2
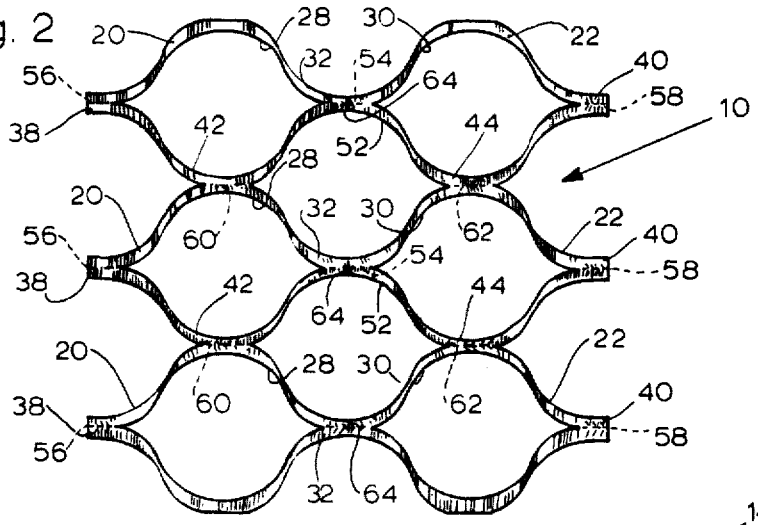
Fig. 3
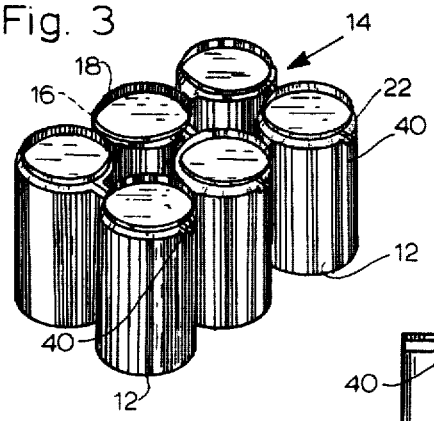
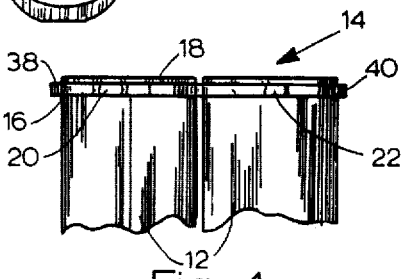
Fig. 4
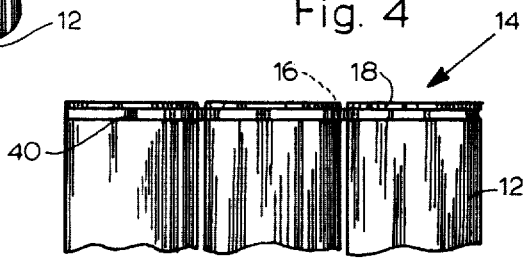
Fig. 5

SCRAPLESS PLASTIC SHEET MULTI-PACKAGING DEVICE

Matter enclosed in heavy brackets [ ] appears in the original patent but forms no part of this reissue specification; matter printed in italics indicates the additions made by reissue.

SUMMARY OF THE INVENTION

The multi-packaging of canned products into groups such as the well known six-pack or eight-pack is most generally achieved through the use of plastic ring can carrier devices which grip containers below the upper rim or enlargement to hold containers together as a group. Typical of such devices are those which are shown in U.S. Pat. No. 2,874,835 where apertured plastic sheet carrier devices are formed from a sheet of stretchable and elastic material such as low density polyethylene.

It has been shown in U.S. Pat. No. 3,785,484 that plastic ring carrier devices may be manufactured from flattened tubular material bands to provide scrapless plastic ring carriers that efficiently utilize material from a manufacturing, shipment, storage and use standpoint. Such scrapless carriers provide energy and cost advantages over apertured plastic sheet carrier devices as well as ecological attributes by enabling individual rings to be separated from one another for retention by containers, thereby allowing one-time disposal of the container and its retained multi-packaging ring.

There has been repeated attempts to produce scrapless multi-packaging devices from plastic sheet material as shown in U.S. Pat. Nos. 2,994,426; 3,044,230; and 3,385,626. All such prior art devices have proved to be commercially non-feasiable since they cannot be applied by high-speed equipment that assemble carriers to containers in the range of 600–1500 cans per minute or more. One of the principal reasons for this is that such prior art carriers do not open to the degree necessary and/or are difficult to stretch for assembly to containers. An automatic opening up feature can be achieved through the use of flattened tubular plastic elements which are formed after the fashion of aforementioned U.S. Pat. No. 3,785,484; however, this has heretofore not been possible with apertured plastic sheet carrier devices, whether of the scrapless variety or not.

Accordingly, it is an object of the present invention to provide a scrapless sheet multi-packaging device which can be assembled by high speed equipment including equipment which is currently in use.

More specifically, it is an object of the present invention to provide a scrapless sheet multi-packaging device which can automatically open up as generally upstanding rings upon longitudinal stretching thereof for assembly to containers.

Still another object of the present invention is to provide a scrapless sheet multi-packaging device which retains all the advantages of other plastic sheet carrier devices while affording manufacturing, shipping, storage and use advantages.

These and other objects and advantages are attained by providing a scrapless plastic sheet multi-packaging device which retains all the advantages of other plastic sheet carrier devices while affording manufacturing, shipping, storage and use advantages.

These and other objects and advantages are attained by providing a scrapless plastic sheet multi-packaging device including a plurality of laterally connected pairs of flat sheet material bands arranged in longitudinal rows, adjacent sheet material bands in each said longitudinal row being longitudinally connected to one another, and each lateral and longitudinal connection being creased along the lateral extent of the connections in opposite alternating directions to one another. The connections may also be perforated between groups of containers and/or individual container bands.

BRIEF DESCRIPTION OF THE DRAWINGS

FIG. 1 is a top plan view of a six-pack scrapless sheet multi-packaging device constructed in accordance with the teachings of the present invention;

FIG. 2 is a top plan view showing the carrier after longitudinal stretching thereof for assembly to containers;

FIG. 3 is a perspective view of a container package including six containers assembled as a group by the carrier depicted in FIGS. 1–2;

FIG. 4 is an elevational view of the package shown in FIG. 3;

FIG. 5 is a side elevational view of the package shown in FIG. 3;

DESCRIPTION OF THE PREFERRED EMBODIMENTS

Figure 6:
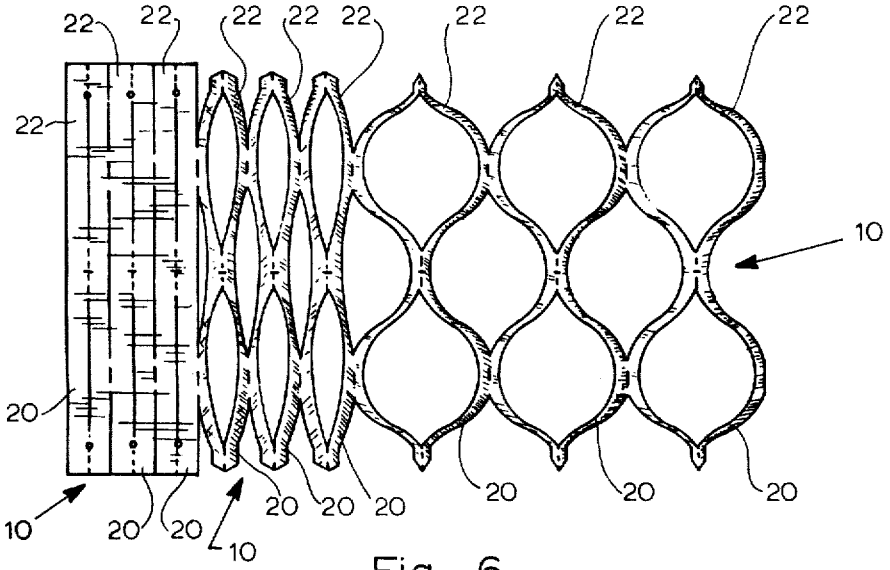
FIG. 6 is a top plan view of an interconnected series of scrapless sheet multi-packaging devices which illustrates how the carrier devices are automatically opened up from closed position when longitudinally stretched.

It is to be understood in the description that is to follow that the term "scrapless plastic sheet multi-packaging device" includes devices which are formed from a plastic sheet with no scrap as described and shown herein; the term "stretchable and elastic plastic material" includes low density polyethelene or other equivalent material which have stretchable and elastomeric characteristics while also being deformable; and the term "container" includes can and bottle products of any shape or size.

Reference is now made to the drawings for a specific description of the invention.

A scrapless plastic sheet multi-packaging device 10 made from stretchable and elastic plastic material is shown in closed and expanded forms in FIGS. 1–2 of the drawings. Such scrapless plastic sheet multi-packaging devices 10 are usefully employed for grouping a plurality of containers 12 together to form a multi-pak such as the six-pack container package 14 illustrated in FIGS. 3–5 of the drawings. The containers 12 shown in the container package 14 are of the "necked-in" can variety which includes a groove or "necked-in" portion 16 immediately below the upper rim or enlargement 18.

The scrapless plastic sheet multi-packaging device 10 is dimensioned to stretch and elastically embrace the containers 12 in the vicinity of the groove or "necked-in" portion of the containers 12 to form the container package 14. The scrapless plastic sheet multi-packaging device 10 may engage other types of containers 12 at other locations, as may be desired.

The scrapless plastic sheet multi-packaging device 10 shown in FIGS. 1–2 includes a plurality of pairs of sheet material bands 20, 22 arranged in longitudinal rows. Each pair of sheet material bands 20, 22 has transversely aligned slit openings 24, 26, as illustrated in FIG. 1, which are capable of being expanded into container receiving openings 28, 30 as shown in FIG. 2.

Each pair of sheet material bands 20, 22 are laterally connected to each other by an inner connecting web 32 which separates the slit openings 24, 26 from each other. The slit openings 24, 26 terminate short of the outer side margins of the multi-packaging device 10 to form outer marginal portions 34, 36 as shown in FIG. 1 which are capable of forming container cushioning elements 38, 40 as illustrated in FIGS. 2–5 so as to prevent engagement between adjacent six-packs in a tray or carton, if desired.

Adjacent connected pairs of sheet material bands 20, 22 are joined to one another across intermediate connecting webs 42, 44 in the longitudinal rows which lie in the vicinity of a general median line that is generally equidistant opposite extremities of the transversely aligned slit openings 24, 26. The intermediate connecting webs 42, 44 are separated from each other by an inner slit 46 while also being spaced from the outer side margins of the multi-packaging device 10 by outer slits 48, 50 that extend from the intermediate connecting webs 42, 44 respectively and intersect the outer side margins of the multi-packaging device 10. The inner slits 46 form the non-container receiving openings 52 while the outer slits 48, 50 contribute to the scalloped outer configuration of the multi-packaging device 10 as shown in FIG. 2.

In order to facilitate automatic opening of the sheet material bands 20, 22 to a generally upstanding relationship for assembly to containers by high speed equipment, the inner connecting webs 32, the outer marginal portions 34, 36 and the intermediate connecting webs 42, 44 are creased or scored. Specifically, a crease 54 is provided in the inner connecting webs 32 and creases 56, 58 are provided in the outer marginal portions 34, 36, all of which are in transverse alignment with the slit openings 24, 26. Creases 60, 62 are also provided in the intermediate connecting webs 42, 44 in transverse alignment therewith; however, the creases 60, 62 of the intermediate connecting webs 42, 44 are creased in a direction opposite to the creases 54 and 56, 58 of the inner connecting webs 32 and outer marginal portions 34, 36, respectively. The result is that laterally extending creases are provided in the inner connecting webs 32 and outer marginal portions 34, 36 in opposite alternating arrangement to the laterally extending creases provided in the intermediate connecting webs 42, 44.

Figure 7:
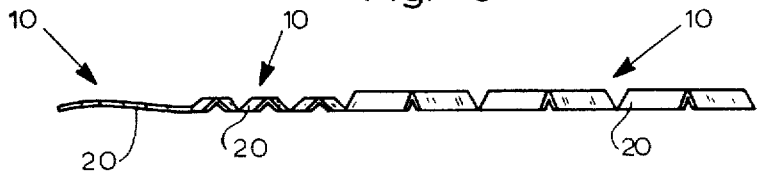
FIG. 7 is a side elevational view of the interconnected series of carrier devices shown in FIG. 6.

The creasing pattern in the slits and connections of the multi-packaging device 10 facilitates automatic opening of the sheet material bands while causing them to assume a generally upstanding relationship. This is best illustrated in FIGS. 6–7 of the drawings where three interconnected multi-packaging devices 10 are shown in closed, partially open and open position. As can be seen in comparing the top plan and side elevational views of FIGS. 6–7, the closed position of the multi-packaging device 10 at the left hand side of the drawings in FIG. 6 is depicted in generally flattened condition in FIG. 7 and as the multi-packaging devices are opened up from the partial to the opened position depicted by the multi-packaging device 10 at the right hand side of the drawings in FIG. 6; the sheet material bands 20, 22 open up and assume a generally upstanding condition relative to the closed and flattened position at the left hand side of the drawings in FIGS. 6–7.

In order to separate sheet material bands into groups of 2, 4, 6, 8, etc., the creases 60, 62 of the intermediate connecting webs 42, 44 are also perforated to the extent necessary to permit separation when machine and/or manual force is applied. Thus, the intermediate connecting webs 42, 44 are both transversely perforated and creased. Where it is also desired to separate the sheet material bands into longitudinal rows and/or separate individual sheet material bands from each other, the transversely creased inner connecting webs 32 are also longitudinally perforated as at 64 to the extent necessary to permit separation when machine and/or manual force is applied. Separation of the sheet material bands into longitudinal rows by machine force provides sheet material band groups of 2, 3, 4, 5, etc. while separation into individual sheet material bands by manual force enables the individual sheet material bands to be retained by the container for one-time disposal of the container and associated sheet material band.

In order to prevent the slits of the multi-packaging device 10 from tearing inadvertently, small circular holes may be provided as at 66 to prevent the slit openings 24, 26 from tearing into the outer marginal portions 34, 36. Small circular holes 66 may also be provided at the extremities of other slits in the multi-packaging device 10, if desired, to limit or prevent inadvertent tearing without interfering with machine and/or manual forces which provides separation along the perforated areas.

Figure 8:
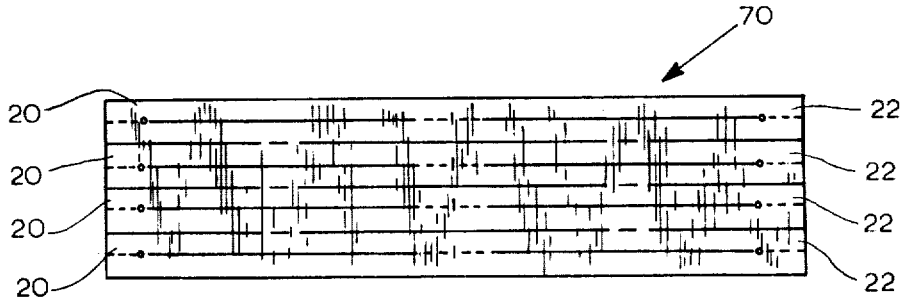
FIG. 8 is a top plan view of an eight-pack scrapless sheet multi-packaging device constructed in accordance with the teachings of the present invention.

Better stress distribution for the sheet material bands 20, 22 and greater can cushioning for the can cushioning elements 38, 40 may be achieved by selectively thickening the relatively thin and flattened sheet of material from which the multi-packaging devices 10 are formed at the center and side marginal portions which generally correspond to the lateral width of the inner connecting webs 32 in the central portion of the sheet and the outer marginal portions 34, 36 at the outer side margins of the sheet.

Where it is desired to provide an eight-pack multi-packaging device, it can be achieved by the configuration represented by the numeral 70 shown in FIG. 8 of the drawings where four pairs of sheet material bands 20, 22 remain connected together for assembly to containers. The eight-pack multi-packaging device 70 is also creased and preferably perforated after the fashion of the six-pack multi-packaging device 10. It will also be apparent that two-packs, four-packs, etc. may be formed by providing one pair, two pair, etc. of sheet material bands 20, 22.

From the foregoing, it will now be appreciated that the present invention contemplates a new and improved scrapless plastic sheet multi-packaging device which achieves the aforementioned objects and advantages.

I claim:

1. A scrapless multi-packaging device for a plurality of containers or the like, said multi-packaging device being made from a stretchable and elastic sheet of plastic material and including a plurality of laterally connected pairs of flat sheet material bands arranged in longitudinal rows, adjacent sheet material bands in each said longitudinal row being longitudinally connected to one another, each of the lateral and longitudinal connections being creased along the lateral extent of said connections in opposite alternating directions to one another whereby longitudinal stretching of said sheet causes said sheet material bands to automatically open and assume a generally upstanding condition for assembly to containers.

2. The multi-packaging device as defined in claim 1 wherein said lateral connections are longitudinally perforated between each pair of laterally connected sheet material bands and said longitudinal connections between adjacent material bands in each said longitudinal row are laterally perforated in order to facilitate separation of individual sheet material bands from each other.

3. A scrapless multi-packaging device for a plurality of containers or the like, said multi-packaging device being made from a stretchable and elastic sheet of plastic material and including a plurality of pairs of sheet material bands arranged in longitudinal rows, each pair of sheet material bands having transversely aligned slit openings and being connected to one another across an inner connecting web, adjacent connected pairs of sheet material bands being joined to one another across intermediate connecting webs which are separated from each other by an inner slit and which are also spaced from outer side margins of the sheet by outer slits that extend from each intermediate connecting web and intersect the outer side margins of the sheet, each of said sheet material bands having creases formed therein in outer side marginal portions of the sheet material bands and in the inner connecting webs between the sheet material bands which are aligned with the slit openings of the sheet material bands, the intermediate connecting webs also being provided with creases which are aligned with the inner and outer slits and which extend in an opposite direction to the creases formed in the outer side marginal portions of the sheet material bands and the inner connecting webs therebetween in order to provide automatic opening of said plurality of pairs of sheet material bands in upstanding condition on longitudinal stretching of said sheet.

4. A scrapless multi-packaging device for a plurality of containers or the like, said multi-packaging device comprising a relatively thin and flattened sheet of stretchable and elastic plastic material, said sheet having a plurality of transversely aligned pairs of slit openings arranged in longitudinal rows, each said pair of slit openings lying wholly within the margins of said sheet to define container receiving openings which are separated from each other by an inner connecting web and which are spaced from the outer margins of said sheet by outer marginal portions, adjacent pairs of transversely aligned slit openings being separated from each other by a pair of transversely aligned outer slits which are spaced from each other by a transversely aligned inner slit, said outer slits extending from and intersecting the margins of said sheet and being spaced from the inner slit by intermediate connecting webs which lie in the vicinity of a general median line that is generally equisdistant opposite extremities of each of said transversely aligned slit openings, creases being provided in said inner connecting webs and outer marginal portions which are transversely aligned to said slit openings, said intermediate connecting webs also being creased in transversely aligned relationship therewith and in a direction opposite to said inner connecting webs and outer marginal portions, all of said slits being openable on longitudinal stretching of said sheet in order to form a plurality of connected pairs of upstanding sheet material bands for stretchably and elastically encircling containers.

5. The scrapless multi-packaging device as defined in claim 4 wherein said inner connecting webs are longitudinally perforated and transversely creased while said intermediate connecting webs are both transversely perforated and creased to facilitate separation of individual sheet material bands from each other.

*6. A generally scrapless multi-packaging device for a plurality of containers or the like, said multi-packaging device being made from a stretchable and elastic sheet of plastic material and including a plurality of laterally connected pairs of flat sheet material bands arranged in longitudinal rows, adjacent sheet material bands in each said longitudinal row being longitudinally connected to one another, each of the lateral and longitudinal connections being creased along the lateral extent of said connections in opposite alternating directions to one another whereby longitudinal stretching of said sheet causes said sheet material bands to automatically open and assume a generally upstanding condition for assembly to containers.*

*7. The multi-packaging device as defined in claim 6 wherein the laterally connected pairs of sheet material bands have transversely aligned slit openings with hole means at opposite extemities of each slit opening to prevent inadvertent tearing of the slit openings into the sheet material bands.*

* * * * *